(No Model.)

P. PIERCE.
MOWING AND REAPING MACHINE.

No. 438,424. Patented Oct. 14, 1890.

Witnesses.  
L. P. Whitaker.  
Wm. E. Dyre.

Inventor.  
Philip Pierce.  
By his Atty  
Whitaker & Prevost.

UNITED STATES PATENT OFFICE.

PHILIP PIERCE, OF WEXFORD, IRELAND.

MOWING AND REAPING MACHINE.

SPECIFICATION forming part of Letters Patent No. 438,424, dated October 14, 1890.

Application filed May 9, 1890. Serial No. 351,130. (No model.)

*To all whom it may concern:*

Be it known that I, PHILIP PIERCE, a subject of the Queen of Great Britain, residing at Wexford, Ireland, have invented new and useful Improvements in or applicable to Mowing and Reaping Machines, of which the following is a specification.

My invention relates to mowing and reaping machines; and it comprises improved means for jointing or connecting the inner or main hinge-shoe with the body or framing to which the said shoe is connected. Such joints as hitherto formed are liable to wear, and the play or freedom resulting is a source of trouble, as it causes the frequent breakage of the connecting-rods and sickles.

According to my invention I make that portion of the hinge-shoe which fits into the frame, and which I term the "shank," conical, and the socket or sleeve into which the said portion fits of a corresponding shape. The small end of the conical portion is toward the rear of the machine, for a purpose hereinafter described. The shank on the hinge-shoe is held in its socket by means of a coiled spring and nut.

To enable my invention to be fully understood, I will describe the same with reference to the accompanying drawings, in which—

Figure 1:
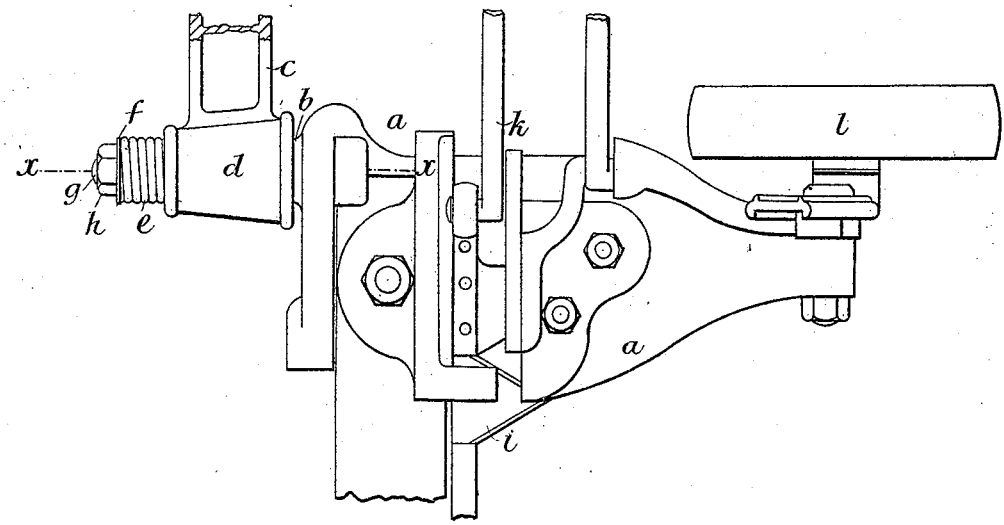
Figure 2:
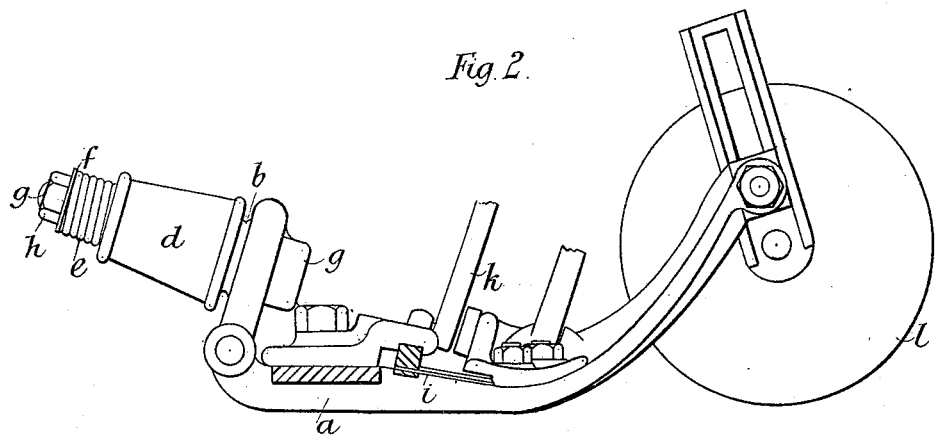
Figure 3:
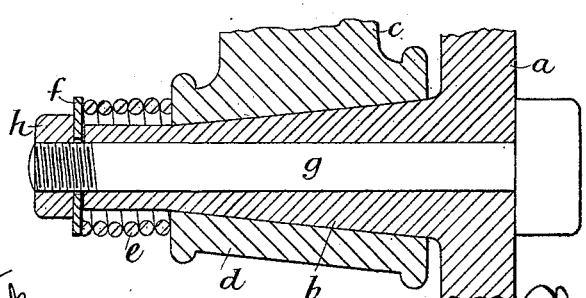

Figure 1 is a plan of so much of a mowing-machine as is necessary to illustrate the application of my invention thereto, and Fig. 2 is a side view of the same. Fig. 3 is a section on the line $x\,x$, Fig. 1, drawn to an enlarged scale.

$a$ is the hinge-shoe having the shank $b$, and $c$ is the portion of the body or framing having the socket or sleeve $d$, into which the shank $b$ fits, the said shank and socket being of conical shape and fitting one within the other, as hereinbefore described.

$e$ is the coiled spring which serves to draw the shank or male cone into the socket or female cone to compensate for any wear, the said spring being confined between the socket $d$ and a collar or washer $f$ on the bolt $g$, which latter is provided with the nut $h$. It will be noticed by reference to Fig. 3 that the bolt $g$ passes through the shank $b$, and thus serves to maintain all the parts in their proper relative positions. If desired, however, the end of the shank may be provided with a screw-threaded stud, in which case the bolt can be dispensed with.

The nut $h$ is secured upon the bolt so as to press the coils of the spring against each other, as shown in the drawings. By this construction the spring acts with all its expansive force to hold the parts together and take up the wear, and at the same time by having its coils in contact it serves as a rigid resistance when the machine is backed or in case any strain is brought to bear on the parts in a direction tending to separate them. It will be seen that if the coils of the spring did not touch each other the backing of the machine would tend to separate the cone-shaped parts by compressing the spring, and grit and other foreign matter might get into the bearing. By my construction the spring, while having its full expansive force continually exerted to hold the parts together and take up wear, has also the additional function of serving as a rigid resistance against any strain tending to force the parts away from each other and compress the spring. The coils being in contact, no compression can take place. By means of the nut $h$ the spring can be adjusted so as to bring its coils into engagement with each other in case they should become slightly separated by wear of the parts.

When the parts are worn so as to allow a small space between the coils of the spring, the adjustable nut $h$ may be tightened so as to draw the said coils together and form a rigid resistance again.

It will be obvious that as the framing is carried forward over the ground (on which the main shoe slides) the sleeve is constantly pressed onto the cone of the hinge-shoe, the working of the machine having a tendency to render the joint formed, as herein described, more perfect, because the wear is being continually taken up during the working.

$i$ indicates a knife or sickle, $k$ the pitman or connecting-rod, and $l$ the shoe-wheel, all of which are of ordinary construction.

I can, if desired, modify the arrangement hereinbefore described by reversing the positions of the male and female cones—that is to say, by forming the male cone upon the framing and the female cone upon the shoe.

Having now particularly described and ascertained the nature of my said invention and in what manner the same is to be performed, I delare that what I claim is—

1. The combination, with the frame and shoe, the one provided with a conical shank and the other with a socket fitting said shank, of a spring engaging said parts and adapted to hold the same together, and securing means for said spring, adapted to hold its coils in contact with each other to produce a rigid resistance, substantially as described.

2. The combination, with the frame provided with a conical socket, of the shoe having a cone-shaped shank for engaging the same, a spring for holding said parts together, and an adjustable securing means for holding said spring in position with its coils in contact, whereby a rigid resistance is provided, substantially as described.

PHILIP PIERCE.

Witnesses:
RICHARD GREENE,
PATRICK GORDON.